(12) United States Patent
Orzechowski

(10) Patent No.: US 6,784,800 B2
(45) Date of Patent: Aug. 31, 2004

(54) INDUSTRIAL VEHICLE SAFETY SYSTEM

(75) Inventor: Jeffery R. Orzechowski, Erie, PA (US)

(73) Assignee: Signal Tech, Erie, PA (US)

( * ) Notice: Subject to any disclaimer, the term of this patent is extended or adjusted under 35 U.S.C. 154(b) by 3 days.

(21) Appl. No.: 09/884,323

(22) Filed: Jun. 19, 2001

(65) Prior Publication Data

US 2002/0190849 A1 Dec. 19, 2002

(51) Int. Cl.$^7$ ................................................ G08B 21/00
(52) U.S. Cl. ................ 340/679; 340/539.1; 340/513.1; 340/680; 340/685; 340/686.5; 340/686.6; 340/679; 701/50
(58) Field of Search .......................... 340/539.1, 573.1, 340/680, 684, 685, 686.5, 686.6, 679; 701/50

(56) References Cited

U.S. PATENT DOCUMENTS

| | | | | |
|---|---|---|---|---|
| 4,928,101 A | * | 5/1990 | Favors | 340/943 |
| 5,047,752 A | * | 9/1991 | Schorn | 340/680 |
| 5,198,800 A | * | 3/1993 | Tozawa et al. | 340/573.1 |
| 5,938,710 A | * | 8/1999 | Lanza et al. | 701/50 |
| 5,939,986 A | * | 8/1999 | Schiffbauer et al. | 340/573.1 |

\* cited by examiner

*Primary Examiner*—Daniel J. Wu
*Assistant Examiner*—Tai T. Nguyen
(74) *Attorney, Agent, or Firm*—Richard K. Thomson

(57) ABSTRACT

A system for enhancing safe operation of industrial vehicles includes at least one of three sets of sensors for detecting pedestrians in zones and providing appropriate responses. Zone 1 includes a two to four foot region around a stationary vehicle which might include personnel who had recently been conversing with the vehicle's operator. Zone 2 extends from 2 to 6 feet from the vehicle and personnel entering Zone 2 will cause the vehicle's horn to sound to prevent their walking into the side of the vehicle. Zone 3 comprises hidden danger zones where personnel may enter a region where an industrial vehicle from outside the area and be unaware of the vehicle's presence. Motion detectors associated with Zone 3 cause activation of an RF tag that reflects a radio signal transmitted by the vehicle. The sounding of the horn will notify both the pedestrian and the vehicle's operator of the potential danger.

16 Claims, 2 Drawing Sheets

US 6,784,800 B2

INDUSTRIAL VEHICLE SAFETY SYSTEM

BACKGROUND AND SUMMARY OF THE INVENTION

The present invention is directed to the field of safety systems which may, for example, be used with industrial vehicles such as forklift trucks. More particularly, the present invention is directed to a safety system for sensing and responding to the existence of a potentially dangerous situation to reduce the occurrence of accidents.

Industrial assembly and merchandising plants employ a large number of industrial vehicles, typically forklift trucks, and experience an inordinate amount of lost time accidents resulting from pedestrian-vehicle accidents. The vehicle operator will often have a large load s/he is coping with and necessarily has her/his full attention on avoiding various obstacles in the vehicle's path. The pedestrians, on the other hand, will frequently enter a region where a forklift truck is operating and be unaware of the potential danger posed thereby. Finally, one or more pedestrians may be in conversation with the forklift operator when the industrial truck is stopped. Believing the conversation to be over, the operator may begin moving the vehicle being unaware that one of the pedestrians is in contact with the vehicle or has an appendage in the path of the truck.

A number of previous attempts have been made to deal with this problem. Many of these systems lack the flexibility required to adapt to various operational situations. Other systems are overly sensitive, picking up inanimate articles near the path of the vehicle resulting in false alarms sometimes requiring the operator to override the safety system to resume normal operation. Other systems fail to distinguish between a pedestrian that is safely passing the vehicle and one that is entering a potentially dangerous situation.

It is a feature of the present invention to deal effectively with this safety problem significantly reducing the incidence of pedestrian-vehicle accidents while overcoming the short comings of the prior art systems. The vehicle safety system of the present invention is for use with an industrial vehicle such as a forklift truck and includes sensor means for detecting at least one person in a particular zone; receiver means associated with said sensor means for producing a response to a detection of an object in said particular zone, said response selected from the group consisting of disabling the industrial vehicle from moving and sounding a warning signal. The sensor means comprises a sensor mounted on the vehicle, or in a zone where the industrial vehicle is operating, for detecting at least one person in a particular zone.

The particular zone comprises a first zone proximate the industrial vehicle and the response consists of disabling the industrial vehicle from moving. The sensor for this first zone will be activated when the vehicle is stopped and will be deactivated when the vehicle begins moving. The particular zone may alternatively be (or in addition include) a second zone adjacent side portions and said response consists of sounding a warning signal, possibly using the industrial vehicle's horn. The sensor means detects a direction of motion of the person entering said second zone and only activates said warning signal if the person is at risk to walk into the side of the industrial vehicle or into the path of the vehicle. The sensors for the second and subsequent zones will be activated when the sensor for the first zone is deactivated, i.e., when the vehicle is moving. The sensor means may be selected from the group consisting of infrared, ultrasonic, radio frequency, laser, electromagnetic, microwave, Doppler shift, photoelectric and motion detection. The sensor means preferably has adjustable sensitivity, range and focus area. It is desirable for some applications that the sensor be capable of distinguishing between animate and inanimate objects but such capability is not essential for the operation of the system.

The particular zone may include a third zone which comprises an area defined as at least one visually obstructed region where the industrial vehicle operates and said response consists of sounding a warning signal, perhaps using the industrial vehicle's horn. In addition, the system may give the vehicle operator a visual signal by illuminating a light on the vehicle's control panel. In the third zone the sensor means preferably comprises one or more motion detectors proximate hidden "danger zones", i.e., those regions where personnel may enter through a door or around a corner and be unaware that an industrial truck is operating in the area. In zone three, the motion detector will preferably activate an RF tag enclosed within the sensor. If an industrial vehicle is operating in the area, an RF transceiver on the vehicle will receive a reflected signal from the RF tag and the horn will sound to give the pedestrian, as well as the driver, a "heads up" that a forklift truck and a pedestrian are operating in the same region.

The invention contemplates a multiple-zone safety system for use with an industrial vehicle, in which the multiple-zone safety system includes at least one (and preferably two) of a) a first zone proximate the industrial vehicle; b) a second zone adjacent side portions of the industrial vehicle; c) a third zone defined as at least one visually obstructed region where the industrial vehicle operates; the safety system including i) a sensor means for each of said zones included in the system; ii) receiver means associated with all of the sensor means to provide a response appropriate to the sensor means for each of the zones.

The invention also contemplates a process of establishing a multiple-zone safety system for an industrial vehicle comprising the steps of sensing at least two of a) a person in a first zone proximate the industrial vehicle; b) a person in a second zone adjacent side portions of the vehicle; c) a person in a third zone which includes at least one visually obstructed region in which the industrial vehicle operates; and d) providing a receiver means associated with said sensor means for producing a response to a detection of an animate object in said particular zone, the response selected from the group consisting of disabling the industrial vehicle and sounding a warning signal.

Various other features advantages and characteristics will become apparent after a reading of the following specification.

BRIEF DESCRIPTION OF THE DRAWINGS

The preferred embodiment(s) of the present invention are set forth in the drawings, like items bearing like reference numerals and in which

FIG. 2 is a top view of a first embodiment of the sensory control panel attachable to the canopy or other portion of the industrial truck.

DETAILED DESCRIPTION OF THE PREFERRED EMBODIMENT(S)

Figure 1:
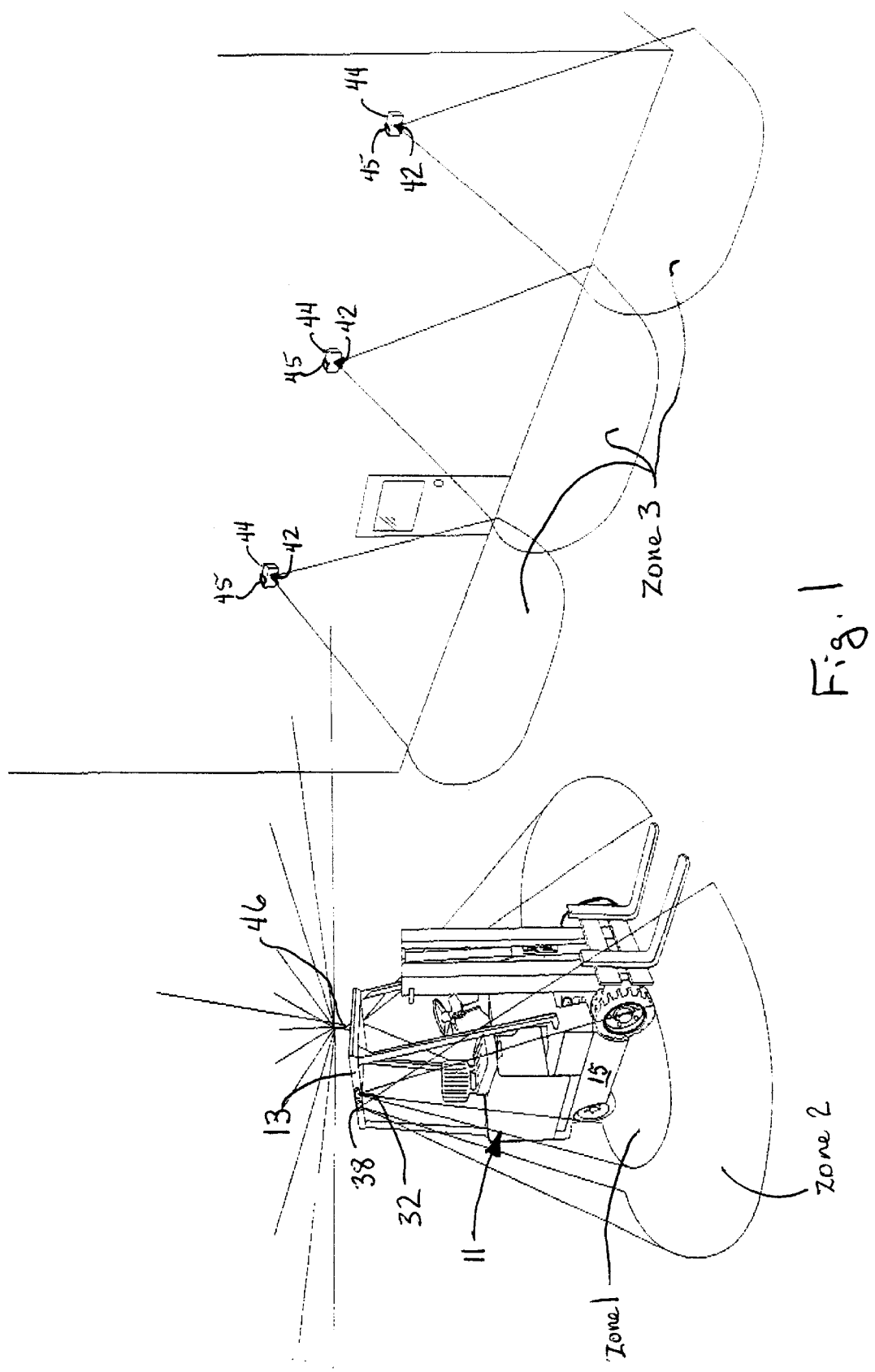
FIG. 1 is a schematic depiction of the industrial truck safety system deployed in a warehouse.

A first embodiment of the industrial truck safety system of the present invention is shown in FIG. 1 generally at 20. An industrial vehicle 11, represented in FIG. 1 as a forklift truck, is equipped with a sensory control panel 24, shown in greater detail in FIGS. 2 and 3. Sensory control panel 24 includes a rectangular tubular body 26 with expandable end portions 28 telescoped into ends 30 of body 26. Sensory control panel 24 is made to fit under the canopy 13 of a conventional industrial truck 11 but may be expanded to fit wider width canopies by sliding end portions 28 outwardly. Further, the sensory control panel 24 may be mounted elsewhere on the vehicle, if desired.

Within each end portion 28, a sensor 32 is pivotally mounted by pin 34. Sensors 32 are utilized to detect the presence of personnel in Zone 1 and are only activated when the truck is motionless. Zone 1 sensors are arrayed to reduce accidents associated with a pedestrian standing proximate the industrial vehicle 11 who may have been conversing with the operator and who may not be aware that, in the operator's opinion, the conversation has ended. The sensors used in conjunction with this system may be of any type including one selected from the group consisting of infrared, ultrasonic, radio frequency (RF), laser, electromagnetic, microwave, Doppler shift, photoelectric and motion detection. For certain applications, it is preferred that the sensors be capable of distinguishing between animate and inanimate objects to reduce or eliminate false signals created by the presence of inanimate objects positioned near the path of the industrial vehicle.

Figure 3:
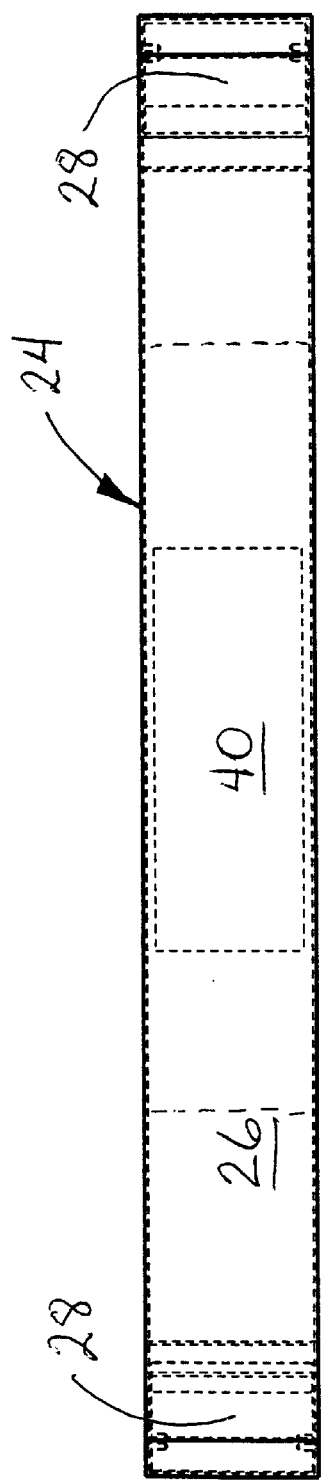
FIG. 3 is a side view of the sensory control panel shown in FIG. 2.
Figure 4:
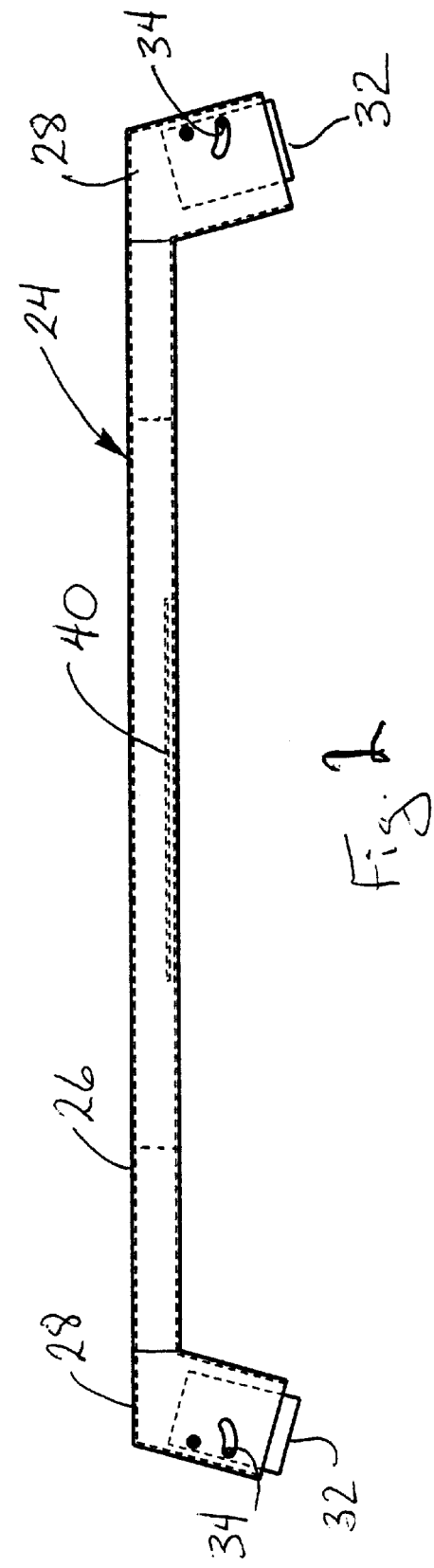

Preferably, sensors 32 are light reflective sensors capable of motion detection and when pointed downwardly, detect changes in refractive index (indicative of movement) within two feet of the side 15 of the truck 11. By tilting the sensor about pivot pin 34 (as shown in FIG. 3), Zone 1 can be expanded to three and one-half feet. It win be understood that these numbers are merely indicative of the system's capabilities and that other sizes of zones can be accommodated by proper choice of sensors and mounting angles. Further, it will be understood that although the sensors 38 for zone two are shown mounted external to the sensor control panel 24, the width of the end portions 28 and sensors 32, 38 could be chosen to incorporate the sensors for zone two into the panel 24. Should either of sensors 32 detect the presence of some body portion in Zone 1, the control panel 40 will send a signal to the truck controls disabling operation of the truck 11. This will prevent the possibility of the industrial vehicle 11 being operated when someone is in close proximity thereto which could result in an injury to that person. The sensors 32 will also disable the truck 11 from operating when the operator is not filly within the confines of the vehicle as, for example, when he/she is entering the passenger seat and might inadvertently engage the gas pedal.

Sensors 38, shown mounted adjacent sensory control panel 24, and also light reflective sensors and are focused on Zone 2 which is anywhere from 2 to 6 feet around the truck 11. Another high incidence of accidents occurs when a pedestrian who is unaware of an industrial vehicle operating in her/his proximity, walks into the side of the vehicle. Sensors 38 will detect the presence of a person moving in Zone 2, send the data to the circuit board 40 of control panel 24 which will determine if the pedestrian is at risk to collide with the vehicle and initiate an audible warning signal. Most preferably, circuit board 40 will cause the vehicle's (11) horn to blast to warn the pedestrian that the truck is in their vicinity.

Zone 3 is defined as one or more areas where a pedestrian entering an area from outside the region might prudently need to be made aware that a forklift truck 11 is operating and where the truck 11 is relative the their own position. In addition, the truck operator 11, who may well be preoccupied with carrying a load, should be made aware that a pedestrian is nearby and that he/she the operator needs to use added caution in operating her/his vehicle. Sensor(s) 42 is/are mounted on a wall or ceiling adjacent Zone 3 and detect motion in that zone. When sensor(s) 42 detect movement in Zone 3 an RF tag 45 inside the sensor housing 44 will be activated. An RF transceiver 46 mounted on the vehicle 11 is constantly emitting a radio wave. When the activated RF tag 45 reflects the radio wave to transceiver 46, control board 40 will cause a warning signal to sound. Again, the preferred signal is a blast of the vehicle's (11) horn signaling both the driver and the pedestrian that they are both moving in the same region. The size of Zone 3 can be varied by the positioning of the sensor and the range of the RF tag 45.

It is preferred that the system include at least two of, and more preferably, all three of the sensors 32, 38, 42 to provide safety in Zones 1, 2, and 3, respectively. In this way, optimum detection and warning can be afforded for pedestrians moving about in a region where a vehicle is operating or standing adjacent a vehicle, perhaps having just finished a conversation with the vehicle's operator. Sensors 32 associated with Zone 1 are only operational while the vehicle 11 is stationary. Sensors 38 associated with Zone 2, are operating whenever the vehicle is in motion. The RF tags 45 utilized with Zone 3 will only be activated when personnel are present in the range of sensors 42 and an alarm will sound only when the industrial vehicle 11 is within a predetermined range of the pedestrian.

Various changes, alternatives and modifications will become apparent to a person of ordinary skill in the art following a reading of the foregoing specification. For example, although light reflective sensors mounted on the vehicle have been indicated as being used for application in Zone 2, it will be understood that wall/ceiling mounted sensors of the type employed for Zone 3 could also be used here in which the RF tag had a shorter range such that only when the sensor(s) 38 detected a pedestrian within 6 feet of the vehicle would the alarm be sounded. It is intended that all such changes, alternatives and modifications as fall within the scope of the appended claims be considered part of the present invention.

I claim:

1. A vehicle safety system for use with an industrial vehicle comprising
  a) sensor means for detecting at least one person in a particular zone including a first zone proximate a lateral portion of the industrial vehicle and, wherein said sensor means comprises a sensor mounted on the industrial vehicle;
  b) receiver means associated with said sensor means for producing a response to a detection of an object in said 1st zone proximate the industrial vehicle, said response consisting of disabling the industrial vehicle from moving when the vehicle's movement is abated; additional sensor means for detecting at least one person in a second zone adjacent and spaced from lateral side portions of said industrial vehicle; and
  additional receiver means for initiation a warning signal responsive to said additional sensor means.

2. The vehicle safety system of claim 1 wherein said sensor means detects a direction of motion of the person entering said second zone and only activates said warning signal if the person is at risk to walk into the side of the industrial vehicle.

3. The vehicle safety system of claim 1 wherein said particular zone comprises a third zone including at least one obstructed area observed by a sensor positioned remotely from said vehicle for detecting a person entering said third zone in which the industrial vehicle is operating and sending a signal to the industrial vehicle.

4. The vehicle safety system of claim 3 wherein said sensor comprises a motion sensor which activates an RF tag associated with said motion sensor sending an RF signal to a transceiver on the industrial vehicle.

5. The vehicle safety system of claim 4 wherein said RF signal received by said transceiver on said industrial vehicle activates said response which includes initiating a warning signal using the industrial vehicle's horn.

6. The vehicle safety system of claim 1 wherein said sensor means is selected from the group consisting of infrared, ultrasonic, radio frequency, laser, electromagnetic, microwave, Doppler shift, photoelectric and motion detection.

7. The vehicle safety system of claim 1 further comprising a sensor control panel mounted on the industrial vehicle, said sensor control panel having two end portions and including at least two sensors, one mounted in each of said end portions of said control panel.

8. The vehicle safety system of claim 7 wherein said end portions may be adjusted relative to a center portion to adjust the overall length of said sensor control panel to accommodate varying sizes of industrial vehicles.

9. The vehicle safety system of claim 7 wherein said sensor means has adjustable sensitivity, range and focus area.

10. The vehicle safety system of claim 9 wherein said sensor means may be adjusted by angularly tilting said sensor means within said sensor control panel.

11. A multiple-zone safety system for use with an industrial vehicle, said multiple-zone safety system including at least a first zone proximate a lateral portion of the industrial vehicle; and at least one of
   a a second zone adjacent side portions of the industrial vehicle;
   b a third zone defined as at least one visually obstructed region within a region where the industrial vehicle operates; said safety system including
      i) a sensor means for each of said first, second and third zones included in said system;
      ii) receiver means associated with all of said sensor means to provide a response appropriate to said sensor means for each of said first, second and third zones.

12. A process of establishing a multiple-zone safety system for an industrial vehicle comprising the steps of
   a) sensing at least i) and one of ii) and iii), where
      i) is a person in a first zone proximate a lateral portion of the industrial vehicle;
      ii) is a person in a second zone adjacent and spaced from side portions of said vehicle; and
      iii) is a person in a third zone which includes at least one visually obstructed region in which the industrial vehicle operates; and
   b) producing a particular response to a sensing a person in said particular zone, said response producing step being selected from the group of steps consisting of disabling the industrial vehicle and initiating a warning signal.

13. The process of establishing a multiple-zone safety system of claim 12 wherein said step of initiating a warning signal comprises the step of actuating a horn on the industrial vehicle.

14. The process of establishing a multiple-zone safety system of claim 13 wherein said step of sounding a warning signal occurs only while the vehicle is in motion.

15. The process of establishing a multiple-zone safety system of claim 12 wherein said step of disabling the industrial vehicle occurs only while the vehicle is stationary.

16. A safety system for use with an industrial vehicle, said safety system including at least one of each of
   a) a first zone proximate a lateral portion of the industrial vehicle;
   b) a second zone adjacent and spaced from lateral side portions of the industrial vehicle;
   c) a third zone defined as at least one visually obstructed region within a region where the industrial vehicle operates; said safety system including
      i) a sensor means for each of said zone included in said system;
      ii) receiver means associated with all of said sensor means to provide a response appropriate to said sensor means for each of said first, second and third zones included in said system.

* * * * *